Oct. 9, 1956 G. B. GUYTON 2,765,805
SEMI-AUTOMATIC VALVE FOR OIL DISTRIBUTING SYSTEMS
Filed April 20, 1953 2 Sheets-Sheet 1

INVENTOR.
Glen B. Guyton
BY
ATTORNEY.

Oct. 9, 1956          G. B. GUYTON          2,765,805
SEMI-AUTOMATIC VALVE FOR OIL DISTRIBUTING SYSTEMS
Filed April 20, 1953          2 Sheets—Sheet 2
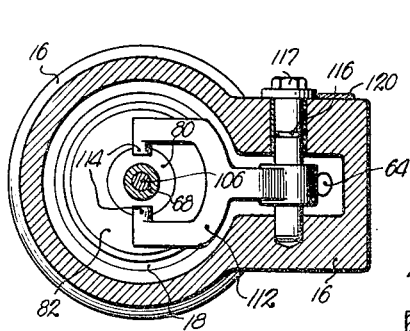
Fig. 4.
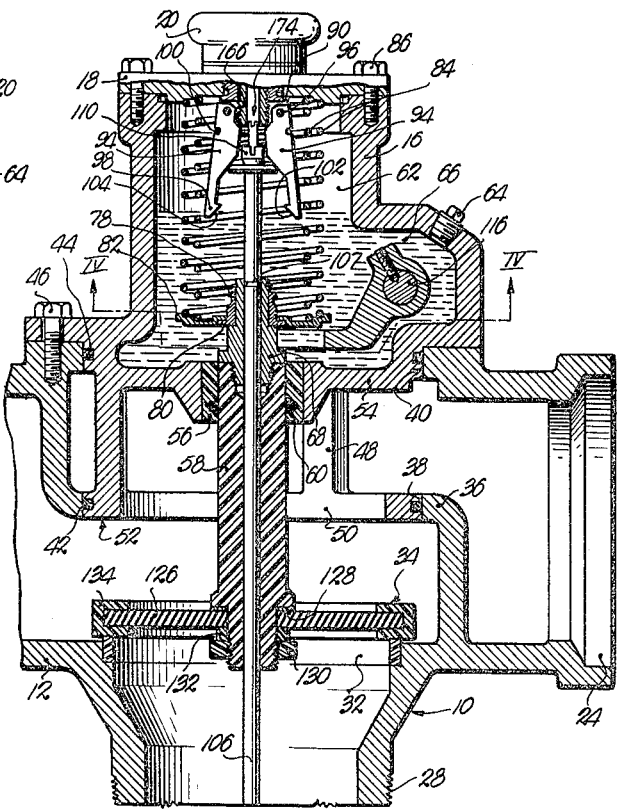
Fig. 5.
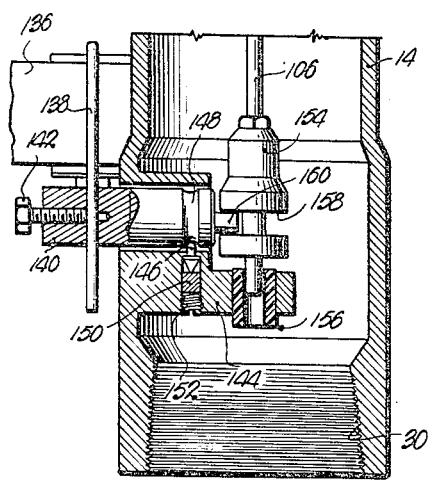
Fig. 3.
Fig. 2.
INVENTOR.
Glen B. Guyton
BY
ATTORNEY.

United States Patent Office 2,765,805
Patented Oct. 9, 1956

2,765,805

SEMI-AUTOMATIC VALVE FOR OIL DISTRIBUTING SYSTEMS

Glen B. Guyton, Tulsa, Okla.

Application April 20, 1953, Serial No. 349,793

14 Claims. (Cl. 137—122)

This invention relates to improvements in valving structure, and particularly to that class of valving means heretofore known and used primarily in the petroleum industry for automatically by-passing petroleum products from tank to tank as the same successively become filled, all without operator attention after initial setting.

It is the primary object of this invention to improve upon valve assemblies of the kind having a valve reciprocable between a pair of seats within the valve body by the inclusion of novelly arranged and operating structure which will not jam, clog or otherwise become faulty because of corrosion.

It is the most important object of this invention to provide a valve of the aforementioned type, having the most vulnerable and essential parts thereof, such as springs, latches and cocking mechanism, grouped together and sealed within an oil compartment in the valve body at the top thereof for maintaining such parts lubricated and protected against corrosion whereby to provide trouble-free operation at all times.

Another very important object of this invention is to provide a valve assembly having a tubular valve stem providing clearance for a trip rod reciprocable in the valve stem and extending from a float at the bottom of the valve through the valve stem and into the sealed oil compartment for tripping the valve as the float is raised by the fluid in a tank therebelow, all for making possible the provision of the protection of the aforementioned essential parts of the assembly through use of an oil compartment as previously mentioned.

Another object hereof is to provide a valve assembly having all parts thereof which are not protected within the sealed-in oil compartment except only for the main body castings, made from a noncorrosive material such as plastic for rendering the same virtually unaffected by the corrosive action of all types of petroleum crude oil.

An important object of this invention is to provide a valve of the aforementioned type that includes structure for imparting a hammer-like blow to a supporting element for the valve stem itself immediately following tripping of the valve to positively assure its breaking loose from one of the seats and movement into cooperative relationship to another opposed seat forming a part of the valve body.

Another important object hereof is to provide shiftable mechanism separate and distinct from the valve itself for tripping the latching means that holds the valve at one end of its path of travel and taking the form of an elongated, float-operated rod reciprocable relative to the valve, the latching means, the above-mentioned hammer means and the valve body within which the rod is disposed.

It is an important object of the present invention to provide a valve assembly designed for float control and having a unique interconnection between the float and the aforesaid rod of the shiftable mechanism which will permit mounting of the float on either side of the valve body without necessitating disassembly at the point of interconnection with the rod.

An important aim of the present invention is to provide a valve assembly having means for interconnecting the float trigger with the reciprocable tripping rod, permitting simple insertion of the trigger to a point where it is releasably retained by a resiliently supported button that snaps into a groove formed in the trigger when the latter is mounted in place.

A further object hereof relates to the way in which resilient means are advantageously employed to maintain the valve in tight engagement with both seats, depending upon the position of the valve, together with the way in which one of such resilient means aids in the closing action of the valve through cooperation with the hammer means that is included to impart a striking blow to the valve stem when the float releases the latching means.

Other objects of this invention include the way in which the component parts thereof are made and arranged to permit disposing essential parts thereof within an oil bath; the manner of permitting setting of the assembly from a point exteriorly of the valve body; the way in which indicating means is provided so that the position of the valve with respect to the seats may be quickly observed from outside the valve body; the way in which adjustments may be made without disassembling the valve unit so that the tripping action takes place at the proper moment when the float rises to a predetermined angle; and the way in which the valve may be manually tripped externally of the valve body simply by removing an access cap.

In the drawings:

Fig. 2 is a view substantially like Fig. 1, showing the valve at the lowermost end of its path of travel.

Fig. 3 is a fragmentary, detailed, cross-sectional view taken on line III—III of Fig. 2.

Fig. 4 is a transverse, cross-sectional view taken on irregular line IV—IV of Fig. 2 looking in the direction of the arrows.

Fig. 5 is a fragmentary, elevational view showing the visual indicating means that is disposed on the outermost face of the valve body.

Figures 1, 1A, 6:
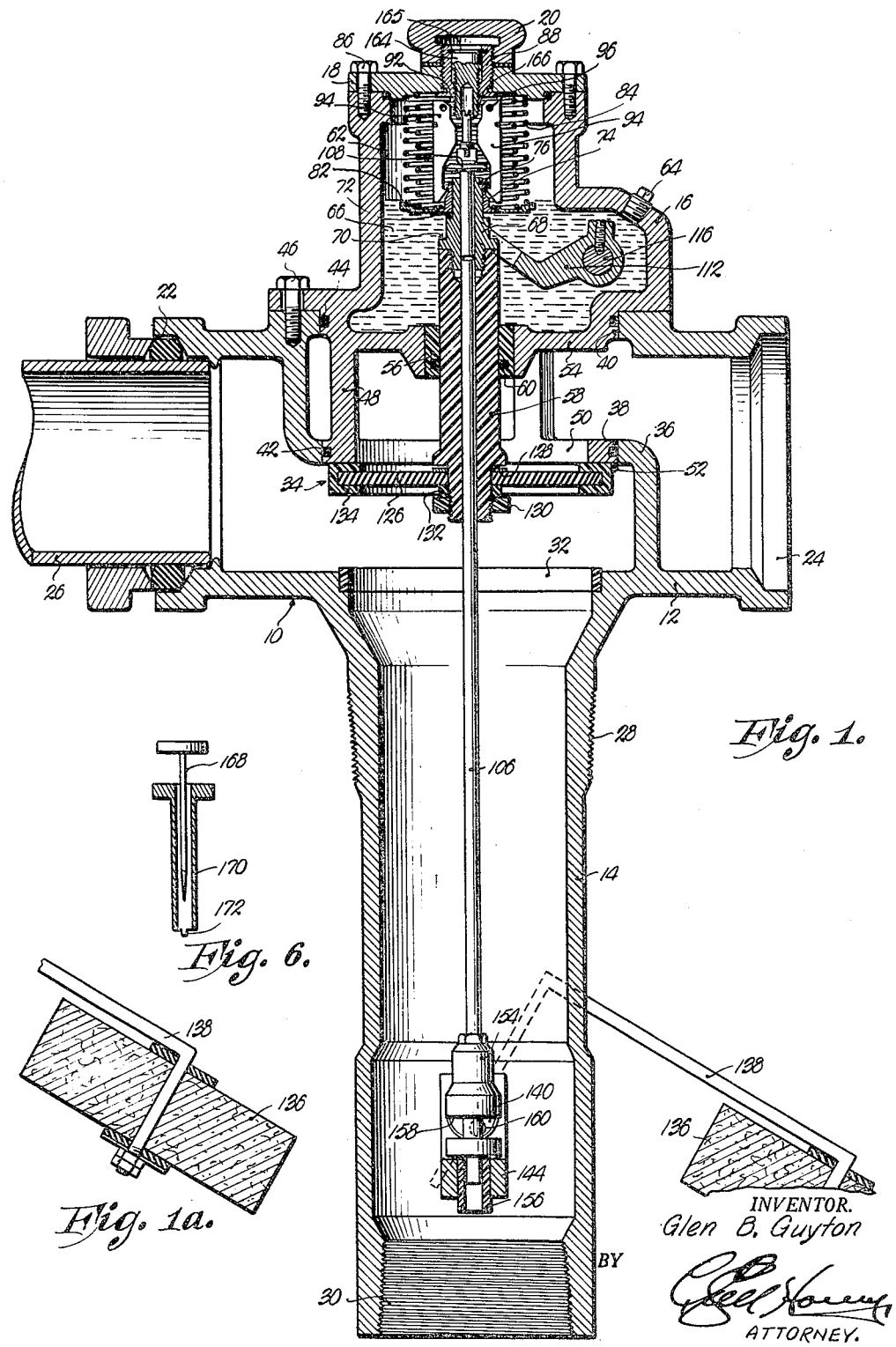
Figure 1 is a vertical, central, sectional view through a semi-automatic valve for oil distributing systems made according to my present invention.
Fig. 1a is a continuation of Fig. 1 showing details of construction of the float.
Fig. 6 is a sectional view of a special tool that is provided for adjusting purposes.

Valve assemblies of the type about to be described, must either operate by power derived from springs within the valve body or by the weight of the valve and its stem mounted therein. A valve which depends on the weight of the inner valve and stem to move the valve to a position closing on a seat when tripped, will operate satisfactorily only so long as the factors do not enter in rendering the weight of the valve and stem insufficient to cause the valve to drop and become seated. The main cause of such failure is corrosion and/or paraffin collecting on the stem and the guides therefor. Furthermore, when the valve depends upon springs for operation after being tripped, corrosion of the springs themselves will oftentimes cause failure. For this reason, springs have not been used in many valves of this type, but a valve having no springs will also not operate under all conditions. Springs are employed in the valve forming the subject matter hereof to assure positive operation, but as will be clear, these springs cannot become inoperable for the reason that the same are protected against the corrosive action of the crude petroleum with which the valve assembly is designed to be used.

The hollow body of the valve shown in the drawings is broadly designated by the numeral 10 and includes a main section 12 having a tubular portion 14 depending therefrom, a bonnet 16, a covering plate 18 for the bonnet 16 and a closure cap 20 removably connected to the plate 18.

Body section 12 has an inlet 22 and an outlet 24, the tubular portion 14 presenting a second outlet for the products flowing into the body 10 by way of inlet 22. Body section 10 is coupled within a flow line 26 and it is to be understood that a series of the valves hereof may be interconnected with each valve being connected to a corresponding tank through the medium of external threads 28 on the tubular portion 14. The tubular portion 14 is provided with internal threads 30 adapting the same for connection with extension tubes as may be desired whereby the petroleum may be discharged at any point within the tank and even adjacent the bottom thereof if such should become desirable or necessary.

The tubular portion 14 communicates with the body section 12 at the bottom thereof and has an annular valve seat 32 disposed for engagement by a valve 34 in the manner shown by Fig. 2 of the drawings.

A substantially Z-shaped partition 36 separating the outlet 24 from the inlet 22 and the tubular portion 14 has an opening 38 therein coaxially aligned with the annular seat 32 and the tubular portion 14 of the body 10. Body section 12 is likewise provided with an opening 40 aligned above the opening 38, and the two openings 38 and 40 receive the bonnet 16 of the body 10 with seals 42 and 44 in openings 38 and 40 respectively, providing a liquid-tight fit for the bonnet 16 when the same is secured tightly in place by removable cap screws 46. The lowermost end of the bonnet 16 which is disposed in the body section 12, consists of a plurality of spaced bars 48 joined by a ring 50 fitted within the opening 38 and providing a second valve seat 52 on its lowermost surface and in facing relationship to the seat 32.

Bonnet 16 has a horizontal floor 54 from which the bars 48 depend, and provided with a bearing 56 that slidably receives structure forming a part of the valve 34 and including a vertically reciprocable valve stem 58, there being a seal 60 around the stem 58 within the bearing or valve stem bushing 56.

The floor 54 presents a lubricant-receiving compartment 62 that is closed by the plate 18 and the cap 20 and provided with a removable fill plug 64 for oil or other lubricant 66. The uppermost end of the valve stem 58 projects into the compartment 62 above the bushing 56 and has a latch collar adaptor 68 removably mounted on its uppermost end. Adaptor 68 has a pair of upwardly facing shoulders 70 and 72 thereon, and loosely receives a latch collar 74 for vertical reciprocable movement relative to the adaptor 68 between shoulder 72 and a retaining ring 76 on the adaptor 68 at its uppermost end. The latch collar 74 has a pair of outturned, annular shoulders 78 and 80, the latter of which loosely receives a plate 82, and a pair of springs 84 are biased between the plate 82 and the cover 18 which is secured to the bonnet 16 in closing relationship to the compartment 62 by cap screws 86.

A tubular latch adaptor 88 carried by the plate 18, receives the cap 20 at its uppermost end and has a polygonal block 90 thereon beneath the plate 18 provided with opposed slots 92 for swingably receiving a pair of latch dogs 94 through the medium of pintles 96 and provided with hooks 98 on their lowermost ends. The dogs 94 are held biased toward each other by a spring 100 interconnecting the same and are each provided with inclined edges 102 and 104 that cooperate with shiftable mechanism which includes an elongated rod 106.

The rod 106 extends upwardly from within the tubular portion 14 through the tubular stem 58 and the tubular latch collar adaptor 68 within which it is free to reciprocate vertically and rotate on its vertical axis. Incidentally, it is to be noted that the valve 34 and its associated parts including stem 58, adaptor 68, collar 74, plate 82 and springs 84 are all mounted for freedom of rotative movement within the body 10.

The rod 106 is threaded near its uppermost end to receive a cam plate 108 that has an upwardly facing, peripheral bevel and a nut 110 integral therewith that is split to present a plurality of segments as shown for rendering the cam plate and nut 108—110 less likely to become maladjusted relative to the rod 106.

The compartment 62 also houses a yoke member 112 (Fig. 4) having opposed ears 114 that embrace the latch collar adaptor 68 between the shoulders 70 and 80 of adaptor 68 and collar 74 respectively. The yoke member 112 is attached rigidly to a rotatable member in the nature of a shaft 116 carried by the bonnet 16 and extending outwardly therebeyond as shown in Figs. 4 and 5. A transverse slot 118 in the rotatable member 116 exteriorly of the bonnet 16, presents pointer means cooperable with a dial 120, graduated as at 122 and 124, to indicate the two positions of the valve 34 shown in Figs. 1 and 2 respectively of the drawings. This outermost end of the shaft 116 is broached as at 117 to receive a cocking handle (not shown) having the shape of a hexagon sectioned rod.

Valve 34 consists of a circular plate 126 surrounding the stem 58 between a downwardly facing shoulder 128 and a nut 130 on the latter, there being a compression ring 132 interposed between the plate 126 and the nut 130. A facing 134 surrounding the peripheral edge of plate 126 is U-shaped in cross-section, and it is this facing 134 that engages the seats 32 and 52 alternately when the valve is placed in operation.

The valve assembly is controlled automatically by a float 136 mounted on a U-shaped support 138 that is in turn carried by a rotatable device 140 and releasably held secured thereto by a setscrew 142. The device 140 is mounted for rotation within an inward extension 144 within the tubular portion 14 and is retained in place by a button 146 biased into an annular groove 148 in the device 140 by a resilient plug 150 that is held within the extension 144 by a screw 152.

The rod 106 has a spool 154 thereon that extends into a bearing or guide bushing 156 carried by the extension 144. An annular groove 158 in the head 154, loosely receives an inwardly extending pin 160 on the rotatable device or trigger 140, it being noted in Figs. 1 and 2 that the pin 160 is eccentric to the axis of rotation of the device 140.

A cap screw 164 carried by the adaptor 88, has a hexagon, cross-sectioned, tool-receiving socket in its uppermost end (not shown) and is held in adjusted positions by a retaining ring 165. The lowermost end of the cap screw 164 extends below the block 90 and is adapted to engage inclined edges 166 on the latching dogs 94. Thus, the latching means 94—108 may be manually tripped by removing the cap 20 and actuating the cap screw 164.

Upon removal of the retaining ring 165 and cap screw 164, the cam 108 and nut 110 may be adjusted longitudinally on the rod 106 through the provision of a tool such as shown in Fig. 6 of the drawings and including an ordinary screwdriver 168 extending into a tube 170 that is inserted into the adaptor 88 until its ears 172 engage with the slots of the nut 110. A kerf 174 in the uppermost end of the rod 106, receives the bit of the screwdriver 168.

The valve assembly is shown in Fig. 2 of the drawings with its parts in the position which they will normally assume after the stock tank with which the valve is associated has filled and the float 136 raised to a position rotating the trigger 140, the rod 106 and the cam 108. When the tank is drained of oil, float 136 will drop to the position shown in Fig. 1, spring 100 will move the dogs 94 toward each other and the valve 134 will remain as shown in Fig. 2. Downward swinging movement of the float 136 is limited by spool 154 coming to rest upon the bushing 156.

When oil is to be pumped to the valve body 10, and accordingly, to its corresponding tank by way of line 26, the operator sets the valve by swinging the yoke member 112 to the position illustrated in Fig. 1 of the drawings. This may be accomplished exteriorly of the valve body 10 through use of a hex-sectioned tool inserted in the socket 117.

Such upward swinging movement of the ears 114 acting on the collar 74, plate 82 and retaining ring 76, raises the adaptor 68, the stem 58 and the valve 34 against the action of springs 84 to the position shown in Figure 1, and when the shoulder 78 of the collar 74 moves against the inclined edges 104 of the dogs 94, the latter will be spread apart against the action of spring 100. The hooks 98 of the dogs 94 will be snapped into place beneath the shoulder 78 by the spring 100 and the valve 34 will thereby be held in engagement with the seat 52 as shown in Fig. 1. Such set position of the valve assembly as shown in Fig. 1 of the drawings, is indicated visually to the operator by virtue of the kerf 118 pointing toward the mark 124, and it can be seen that while the valve 34 is in engagement with seat 52, the product flowing in the line 26 will be directed through the body section 12, below valve 34 and into the tubular portion 14 where they gravitate into an underlying storage tank.

It is to be noted in Fig. 1 that by virtue of the looseness of the valve 34 on the stem 58 between shoulder 128 and nut 130, ring 132 will be compressed slightly as the operator manipulating the shaft member 116, forces the stem 58 upwardly. The shoulder 128 will move upwardly away from the plate 126 and the compression element 132 will yieldably bias the facing 134 tightly against the seat 52 while the latching means 94—78 hold the valve assembly in the set position.

As the level of liquid in the tank rises, it will raise the float 136 from the position shown in Fig. 1 of the drawings upwardly to rotate the device 140 anticlockwise viewing Fig. 1, and as the pin 160 swings upwardly in the groove 158, it will raise the spool 154, the rod 106 and the cam 108 from the position shown in Fig. 1 to a point where cam 108 comes into engagement with the opposed, inclined edges 102 of the latches 94. Spreading of the latches 94 against the action of spring 100 withdraws the hooks 98 from beneath the shoulder 78 of collar 74.

The first action that takes place after withdrawal of the hooks 98 is for the springs 84 to snap the collar 74 downwardly with great force against the shoulder 72 of adaptor 68 and this hammer-like blow assures dislodgment of the valve 34 from the seat 52. Any corrosive or other action that may tend to cause the valve 34 to stick to the seat 52 will be overcome by such hammer blow and as soon as the valve 34 is thus loosened or dislodged, the action of springs 84 will continue the downward movement of the valve 34, the stem 58, the adaptor 68, the collar 74 and the plate 82 until the valve 34 rests tightly on the seat 32. Thereupon springs 84 operate to hold the valve 34 against the seat 32 as shown in Fig. 2, while the liquid emanating from the line 26 flows into the body section 12 above the valve 34, thence upwardly through the ring 50, past the bars 48 and thence outwardly through the opening 24.

It is noted in Fig. 2 of the drawings, that plate 82 carries the yoke member 112 downwardly therewith, rotating the shaft 116 and moving the kerf 118 to a position pointing toward the mark 122 thereby indicating to the operator that the valve 34 is in the position shown in Fig. 2 of the drawings. This action stops the flow of fluid to the tubular portion 14 and to the filled tank therebelow, and manifestly, the flow from outlet 24 may well be to another valve which may be previously set so that such liquid thereupon passes to the next storage tank.

In this respect therefore, as above indicated, a series of tanks each provided with a valve assembly of this type, may be interconnected and successively filled as desired. It is not necessary to set all of the valves since tanks that are not to receive liquid may be by-passed by leaving its valve in the position shown in Fig. 2 of the drawings. In the event however, that a valve is in a "set" position as shown in Fig. 1, and the operator subsequently desires to by-pass its corresponding tank, he may remove the cap 20 and trip the latching means manually. To do this, he merely rotates the socket head cap screw 164 to move the same against the inclined edges 166 of the dogs 94, thereby spreading the latter against the action of spring 100 and removing the hooks 98 from beneath the shoulder 78. The cap screw 164 should thereupon be screwed back upwardly until it locks against the retaining ring 165.

In order to make the tripping action take place when the pin 160 and the float 136 are at the desired angle (which is approximately horizontal as shown in Fig. 2), an adjustment may be made through the use of a special tool shown in Fig. 6. With this tool the operator may alter the position of the cam 108 and the nut 110 integral therewith. He first removes the retaining ring 165, the cap screw 164 and thereupon inserts the tube 170 into the adaptor 88 until the ears 172 engage in the slots of the nut 110. He thereupon inserts the screwdriver 168 into the kerf 174 to hold the rod 106 against rotation while he turns the tube 170 to move the cam 108 and the nut 110 with respect to the rod 106.

It is to be noted that the float 136 may be positioned on either side of the tubular portion 14 as may be desired. It may be pulled out and re-inserted substantially 180° from the position shown in the drawings to a position on the opposite side of the tubular portion 14 and this merely swings the pin 160, 180° where it will function in the same manner as above described to raise and lower the rod 106. If desired, the operator may thereupon invert the float 136 by loosening the setscrew 142 and re-inserting the support 138 into the rotatable device 140. The plug 150 is of resilient material for yieldably holding the plug 146 in the groove 148 and the operator may easily and quickly remove the device 140 and re-insert the same from a point exteriorly of the tubular portion 14 as desired.

An important feature of this invention lies in the way in which a reciprocable rod 106 is utilized as the shiftable mechanism for tripping the latching means. The novel way in which the rod 106 is slidably mounted in the valve stem 58 constitutes an important improvement in valve assemblies of this nature for it has no connection with the valve 34 whatsoever and each of these two mechanisms operates separately and independently from the other.

One of the most difficult problems in this field is the provision of trouble-free operation in face of the conditions under which the valves must operate. In this respect the corrosive action of the materials handled upon the valve parts, causes sticking and jamming and presents a source of trouble at all times. The valve assembly hereof accordingly has been purposely designed to absolutely overcome such problems and in this respect the provision of the lubricant-receiving chamber 62 is of extreme importance. All of the parts within this chamber 62 may be made from conventional materials as desired since the same are kept under lubrication at all times and cannot corrode, rust or undergo extreme wear because of the provision of the lubricant 66. In this respect, it is to be pointed out that when the snap action of the collar 74 against the shoulder 72 takes place as above explained, the oil 66 in the compartment 62 will splash upwardly through and around the latching means, the springs and all parts of the valve assembly within the chamber 62.

In view of the unique construction of the valve assembly hereof, valve body 10, including the section 12 thereof, the bonnet 16, the cover plate 18 and the cap 20, may all be made from cast iron. Similarly, no deleterious effects will be experienced if steel is used for the dogs 94, the cam 108, nut 110, the springs 84 and 100, the collar 74, adaptor 68, plate 82, pintles 96, block 90, adaptor 88, retainer 76, plug 164 and the bolts 46 and 86. It is to be preferred however, that the yoke member 112 be cast from bronze and that the shaft 116 be made from stainless steel. Other stainless steel parts may include the rod 106, the setscrews 142 and 152 and the support 138. The float 136 should be made from material that will withstand the action of the petroleum products and foam glass is suitable for this purpose.

The remaining essential parts of the valve assembly will however, be produced from suitable synthetic products readily available on the open market and reference may be made to proprietary products sold under the trademarks "Hycar," "Synthane" and "Neoprene." "Neoprene" is an excellent synthetic rubber formed by addition of hydrogen chloride to vinylacetylene followed by isomerization to form chloroprene.

"Hycar" is particularly suitable because it has excellent oil, corrosion, abrasion and aging resistance. Its flex life is good, as it constitutes a synthetic rubber lastic formed of a butadiene acrylonitrile copolymer of the thermosetting type.

"Synthane" has similar corrosion resistant properties and is capable of resisting the abrasive action of parts which its frictionally engages. Furthermore, these synthetic resins are particularly suitable when used with crude petroleum and other substances that would normally have adverse chemical effects thereon. "Synthane" particularly may be purchased on the open market as a reinforced synthetic plastic consisting of fiber laminae joined by a phenolic resin.

It is contemplated therefore, that the seals 42, 44 and 60, and shaft 116 seal and rod 106 seal, the compression ring 132, gasket 128, seal 107 on rod 106, seal 117 on shaft 16, and the plug 150 be made from "Hycar." This product comes in various degrees of resiliency and accordingly, all of the seals, including those shown but not hereinabove mentioned, will effectively prevent leakage and/or entrance of foreign substances when made from materials of this nature. Furthermore, because of the resiliency thereof, it presents a very satisfactory substance to yieldably hold the valve 34 against the seat 52 and to yieldably maintain the button 146 within the groove 148.

A reinforced synthane substance is satisfactory for the plate 126 of the valve 34 and may be also used to produce the facing 134, but in the latter a degree of pliability and resiliency is desired not only to permit easy slipping of the facing 134 upon the plate 126, but to provide a positive engagement of the facing 134 against the seats 32 and 52. Seat 32 may likewise be produced from synthane. Nut 130, head or spool 154, bushing 156, trigger or rotatable device 140 and button 146, all subjected to the crude petroleum, are suitably formed from this proprietary product "Synthane."

Finally, in producing the bearing 56 and the stem 58, it is to be preferred that the last-mentioned product be employed because of its advantageous characteristics above set forth. It is now seen that the only movable metallic part which is subjected to the action of the product is the elongated rod 106 and since this rod is to be made from stainless steel, the action of the products thereon will not tend to cause any difficulty in the automatic operation herein contemplated.

While the materials desired have been set forth with particularity, such description has been for the purpose of showing how the design of the valve assembly hereof permits wide selection of materials to avoid faulty operation and manifestly, the type of materials used has no bearing upon the overall principle of operation as set forth in the appended claims.

Having thus described the invention what is claimed as new and desired to be secured by Letters Patent is:

1. In a valve assembly, a hollow body having an upper and a lower valve seat; a valve reciprocable between said seats; releasable latching means carried by the body above the seats; structure mounted on the valve thereabove for movement therewith and engaging the latching means when the valve is on the upper seat; a yoke element swingably mounted in the body above the seats and embracing said structure for moving the latter into engagement with the latching means; and an engageable member extending through the body and secured to the yoke element for swinging the latter.

2. In a valve assembly, a hollow body having a pair of spaced valve seats; a valve reciprocable between said seats; releasable latching means carried by the body; structure mounted on the valve for movement therewith and engaging the latching means when the valve is on one of the seats; shiftable mechanism engageable with the latching means for actuating the latter to release the valve for movement toward the other seat; and resilient means interposed between the valve and said structure for holding the valve biased against said one seat when the structure is in engagement with said latching means.

3. In a valve assembly, a hollow body having an upper and a lower valve seat; a valve reciprocable between said seats; releaseable latching means carried by the body above the seats; structure mounted on the valve thereabove for movement therewith and provided with hammer means engaging the latching means when the valve is on the upper seat; mechanism shiftable with respect to the valve and said structure and having a cam member thereon engageable with the latching means for actuating the latter to release the valve for movement toward the lower seat; and means engaging the hammer means for forcing the latter against said structure upon release of said latching means to dislodge the valve from said upper seat.

4. In a valve assembly, a hollow body having an upper and a lower valve seat; a valve reciprocable between said seats; releasable latching means carried by the body above the seats; structure mounted on the valve thereabove for movement therewith and engaging the latching means when the valve is on the upper seat; a yoke element swingably mounted in the body above said seats and embracing said structure for moving the latter into engagement with the latching means; an engageable member extending through the body and secured to the yoke element for swinging the latter; dial means on the body; and pointer means on said member and disposed for cooperation with said dial means to indicate the position of said valve relative to the seats.

5. In a valve assembly, a hollow body having an upper and a lower valve seat; a valve reciprocable between said seats; releasable latching means carried by the body; above the seats; structure mounted on the valve thereabove for movement therewith and engaging the latching means when the valve is on the upper seat; mechanism shiftable with respect to the valve and said structure and engageable with the latching means for actuating the latter to release the valve for movement toward the lower seat; a rotatable device carried by the body beneath the seats; a swingable float secured to the device for rotating the latter; and an offset pin on said device and engaging said mechanism for shifting the latter into engagement with said latching means upon swinging of the float to one end of its path of travel.

6. In a valve assembly, a hollow body having an upper and a lower valve seat; a valve reciprocable between said seats; releasable latching means carried by the body above the seats; structure mounted on the valve thereabove for movement therewith and engaging the latching means when the valve is on the upper seat; mechanism shiftable with respect to the valve and said structure and engageable with the latching means for actuating the latter to release the valve for movement toward the lower seat; a rotatable device carried by the body beneath the seats; a swingable float secured to the device for rotating the latter; a pin on one end of said device disposed eccentrically to the axis of rotation of the device; and means on said mechanism having a groove receiving said pin, whereby the mechanism is shifted into engagement with the latching means upon swinging of the float to one end of its path of travel.

7. In a valve assembly, a hollow body having an upper and a lower valve seat; a valve reciprocable between said seats; releasable latching means carried by the body above the seats; structure mounted on the valve thereabove for movement therewith and engaging the latching means when the valve is on the upper seat; mechanism shiftable with respect to the valve and said structure and engageable with the latching means for actuating the latter to release the valve for movement toward the lower seat; and means separate from said mechanism and shiftable into engagement with the latching means for releasing the latter.

8. In an automatic by-pass valve having a hollow body provided with a pair of spaced valve seats, a partition in said body above the valve seats, presenting a closed compartment; a valve reciprocable between said seats and including an elongated stem extending upwardly into said compartment, said partition having an opening therein for receiving the stem, said stem having a longitudinal passage therein; releasable latching means carried by the body within said compartment; structure mounted on the stem for movement therewith into engagement with the latching means when the valve is on one of the seats; an elongated rod reciprocable in said passage; and means on the rod engageable with the latching means for releasing the latter upon reciprocation of the rod whereby to free the valve for movement toward the other seat.

9. In a valve assembly, a hollow body having an upper and lower seat; a valve reciprocable between the seats; releasable latching means carried by the body above the seats; structure mounted on the valve thereabove for movement therewith and engaging the latching means when the valve is on the upper seat; a member carried by the valve and reciprocable therein, said member being engageable with the latching means for actuating the latter to release the valve for movement toward the lower seat, the lowermost end of the member extending below said lower seat; and mechanism engaging said end and shiftable to and from a position shifting the member into engagement with said latching means.

10. In a valve assembly, a hollow body having an upper and lower seat, a valve reciprocable between the seats and including an elongated, upstanding, tubular stem; releasable latching means carried by the body above the seats; catch structure on the uppermost end of the stem for movement therewith and engaging the latching means when the valve is on the upper seat; a member carried by the valve and reciprocable in the latter and in the stem, said member having a cam on the uppermost end thereof engageable with the latching means for actuating the latter to release the valve for movement toward the lower seat, the lowermost end of the member extending below said lower seat; and mechanism engaging said lowermost end and reciprocable to and from a position shifting the cam into engagement with said latching means.

11. In a valve body as set forth in claim 10 wherein there is provided means carried by the body separate from said cam and shiftable into engagement with the latching means for releasing the latter.

12. In a valve body as set forth in claim 10 wherein said releasable latch means includes a pair of latch dogs pivotally mounted on the body and having hooks engageable with said catch structure, there being provided means for biasing the dogs toward each other.

13. In a valve body as set forth in claim 12 wherein there is provided a cam surface on each dog respectively adapted for engagement by said cam whereby the dogs are spread relatively and the catch structure released from the hooks upon reciprocation of said mechanism to a position moving the cam into engagement with said surfaces.

14. In a valve assembly, a hollow body having an upper and lower seat; a valve reciprocable between the seats and including an elongated, upstanding, tubular stem; releasable latching means carried by the body above the seats; catch structure on the uppermost end of the stem for movement therewith and engaging the latching means when the valve is on the upper seat; a member carried by the valve and reciprocable in the latter and in the stem, said member having a cam on the uppermost end thereof engageable with the latching means for actuating the the latter to release the valve for movement toward the lower seat, the lowermost end of the member extending below said lower seat; resilient means engaging the catch structure and the body in encircling concentric relationship to said member for moving the valve against the lower seat upon release of said latching means; and mechanism engaging said lowermost end and reciprocable to and from a position shifting the cam into engagement with said latching means.

References Cited in the file of this patent

UNITED STATES PATENTS

| | | |
|---|---|---|
| 2,145,820 | Tucker | Jan. 31, 1939 |
| 2,277,837 | Auld | Mar. 31, 1942 |
| 2,560,104 | Guyton | July 10, 1951 |
| 2,614,576 | Taylor | Oct. 21, 1952 |
| 2,660,188 | McCartney | Nov. 24, 1953 |